United States Patent [19]
Gibson

[11] 3,834,138
[45] Sept. 10, 1974

[54] FASTENER

[75] Inventor: Duane M. Gibson, Milwaukie, Oreg.

[73] Assignee: Omark Industries, Inc., Portland, Oreg.

[22] Filed: Oct. 4, 1972

[21] Appl. No.: 296,063

[52] U.S. Cl. .................................. 56/290, 85/7
[51] Int. Cl. ............................................ A01d 55/24
[58] Field of Search ............... 56/290, 291; 85/50; 151/38

[56] References Cited
UNITED STATES PATENTS

| | | | |
|---|---|---|---|
| 1,016,798 | 2/1912 | Thomson | 151/38 |
| 1,402,560 | 1/1922 | Anthony | 24/33 B |
| 1,666,783 | 4/1927 | Kries | 85/50 R |
| 1,849,406 | 3/1932 | McCrudden | 85/50 R |
| 3,651,626 | 3/1972 | Locati | 56/290 |
| 3,699,757 | 10/1972 | Hulburt | 56/291 |

Primary Examiner—Edward C. Allen

[57] ABSTRACT

A fastener for fastening working elements to a flexible carrier belt including a stem with an insertable end portion adapted to fit through aligned slots in a washer and the carrier belt which end is fastened under tension to the working element. The belt, at the location of the slot, is undercut to form a cog like notch and the washer is bowed to fit the notch. The trailing end of the stem is flared so as to mate with the bowed washer which prevents the stem from being pulled through the carrier belt.

2 Claims, 5 Drawing Figures

PATENTED SEP 10 1974　　3,834,138
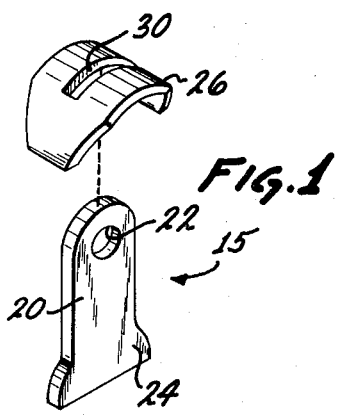
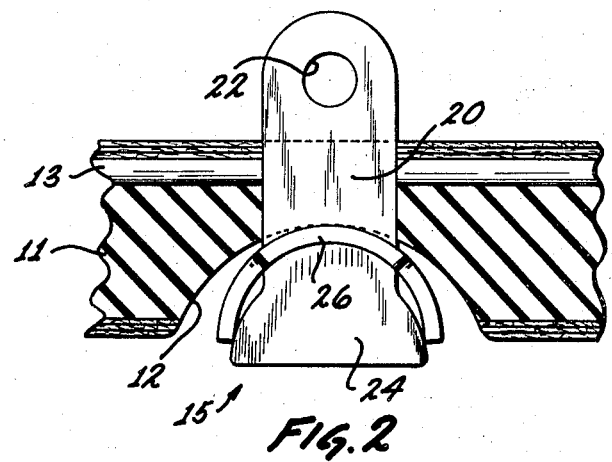
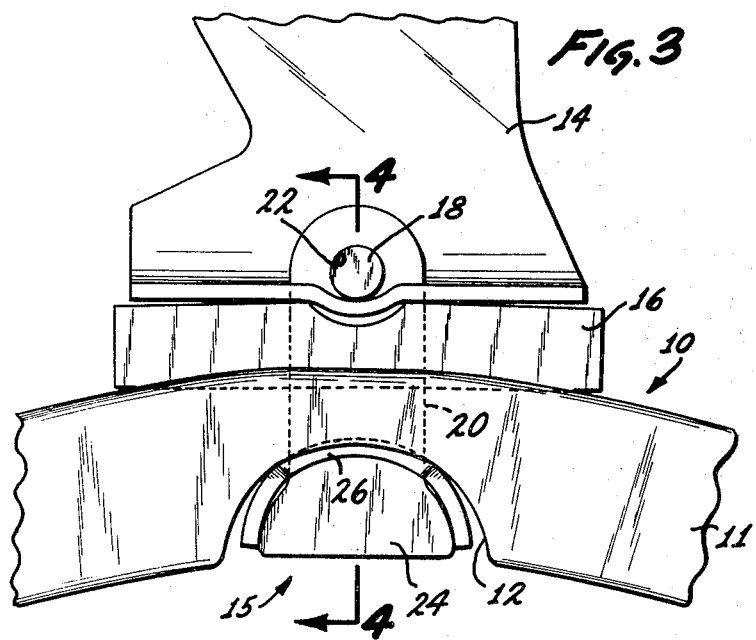
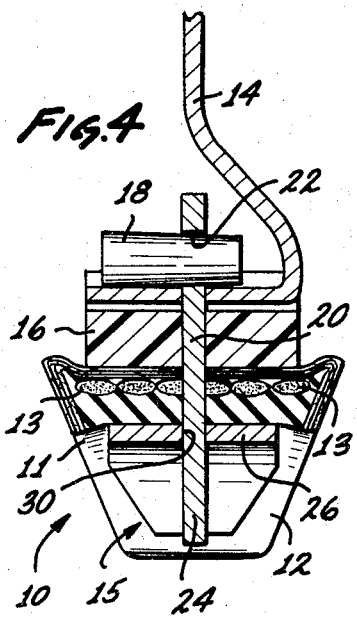
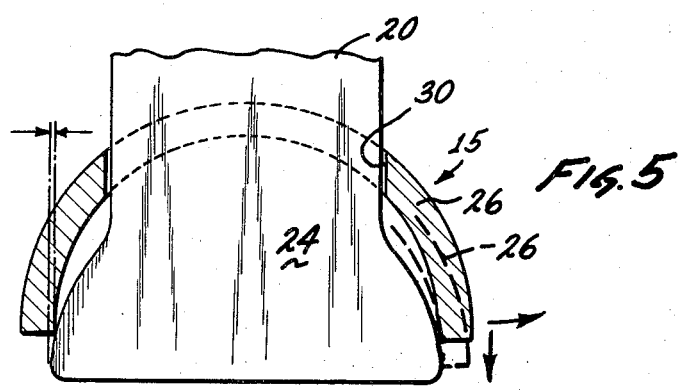

FASTENER

HISTORY

This invention relates to a fastener for fastening rigid working elements to a flexible belt.

Fastening of rigid working elements such as metal cutters to a flexible belt has encountered problems wherein because of the working of the rigid material against the flexible material rapid wearing occurs. Such fasteners quickly work their way through the flexible material causing release of the fastener and/or destruction of the belt. Fasteners which have been developed to cope with this problem are exemplified by U.S. Pat. No. 3,651,626. In that patent it is noted that the stem of the fastener has a cross bar at one end. The cross bar prevents removal and because it terminates at the approximate neutral axis of the belt, working of the rigid metal cross bar within the belt is minimized. More recently, improvements have been made to the fastening concepts by providing cog like notches in the underside of the carrier belt. Thus, whereas previously the stem of the fastener was molded into the belt in order to locate the cross bar at the neutral axis, the notch permits insertion of the stem from the underside with the cross bar placed inside the notch to thus be located at the desired neutral axis.

Fasteners of the present invention are contemplated for use in cutter belts for mowers. Whereas the cutter belt is believed to be a substantial improvement over conventional sickle bar mowers, before it can be commercially successful, it must be competitive in cost. Whereas many fasteners are required for a single belt, the cost of making the fasteners is important.

BRIEF DESCRIPTION

The present invention is found to improve both the performance of the fasteners and the cost of producing it. The stem is flat but with a widened or flared end. The cross bar of the stem of the prior fastener is replaced by a bowed washer that fits over the narrow end of the stem to be nested against the flared end. The bowed washer is adapted to fit into the cog like notch in the belt. These two pieces are much cheaper to manufacture in that they are merely constructed of flat sheets of metal and it is found that by making the radius of the bowed washer somewhat smaller than the radius of the flared end of the stem, an interference fit is produced that greatly enhances the life of the fastener. Having briefly described the preferred embodiment of the invention, it will be more clearly understood by reference to the following detailed description and drawings wherein:

FIG. 1 is a schematic illustration of a two piece fastener in accordance with the present invention;

FIG. 2 is a side view of the fastener of FIG. 1 assembled and inserted through a carrier belt but before a working element is attached;

FIG. 3 is similar to FIG. 2 except that a working element is fastened by the fastener to the belt;

FIG. 4 is a cross-sectional view taken on section lines 4—4 of FIG. 3; and

FIG. 5 is an enlarged view of the base of the fastener illustrating the interference fit between stem and washer.

Referring to the drawings, cutter belt 10 includes a V-belt 11 of common construction but preferably having increased strength as provided by strengthening filaments 13 (FIGS. 3 and 4). Cog like notches 12 are provided in the underside of the V-belt 11 and are adapted to receive a fastener 15 such that the base of the fastener (where the fastener engages the belt at the top of the notch) is located at the approximate neutral axis of the belt. The stem 20 of the fastener 15 is inserted through a slot in the belt and then through a slot in a cushioning or tensioning pad 16. The inserted end is then fastened to a working element 14 by a pin 18. It will be understood that a tensioning pad is compressed beneath the working element and the resiliency of the pad places the stem 20 under constant tension.

The fastener 15 is formed of a separate stem 20 having an insertable end portion with an opening 22 to receive the fastening pin 18. The opposite end of the stem is formed into a flared semi-circular end 24. A washer 26 is formed of a pre-bowed metal strip having a slot 30 therein for receiving the insertable end of stem 20 up to but not permitting passage of the flared end 24. The radius of the pre-bowed washer 26 is provided so as to be slightly tighter or smaller than the radius of the flared end 24 of the stem. Thus as seen in FIGS. 2, 3 and 5, assembling the washer onto the stem requires that the washer be forced down over the end 24 of the stem 20 creating an interference fit. This interference fit is dictated by the resiliency of the washer and the difference in radius between the bowed washer and the flared end 24.

A two piece fastener which has been constructed by applicant and incorporated into a cutter belt which was mounted on a mower and successfully field tested, is specifically described in the following example:

The two metal pieces are made from 0.050 inch gauge medium to high carbon alloy steel. The stem of the fastener is blanked and hole punched, shaved and burnished, with appropriate chamfer on both sides. The washer is blanked, bowed and then slotted. The slot is made 0.002 to 0.005 inch wider than the stem thickness and the projected length of the slot is made 0.005 to 0.010 inch greater than the width of the mating portion of the stem.

The fastener is designed to fasten a cutter element to a B thickness V-belt having cog like notches formed on the underside. These notches are approximately half circles formed with a radius of about 0.30 inch. A slot is provided through the belt at the apex of the notch having the same dimensions as the slot in the washer.

The stem of the fastener has a length of about 0.90 inch. The width at the base is about 0.46 inch and the width of the insertable portion is 0.33 inch. An opening for a fastening pin is provided having a radius of 0.062 inch with the center point located 0.71 inch from the base. The radius of the flared end which is just less than a half circle is 0.23 inch.

The washer when flat and as stamped is an Octogon having a length of 0.75 inch and a width of about 0.40 inch. The bowed washer forms a radius of about 0.215 inch on the inside and the length of the slot when bowed is 0.33 inch.

It will be noted that the bowed washer forms a curve having an inside radius approximately 0.015 inch less than the radius of the flared end of the stem. Thus, upon assembly with the stem inserted through the washer, the slot in the V-belt, and fastened to the cutter element under tension, e.g., with a compressed resilient pad between the belt and the cutter element, the flared end of the stem is forced into the curve of the bowed washer causing the curve of the washer to spread open. The resiliency of the washer clamps the washer to the stem thus preventing any tendency for fretting and consequent loosening. With the stem under tension, this clamped-together condition persists even in the face of severe service loading.

It has been found that much improved fatigue life results from slotting the washer after bowing. Also it is preferable that both stem and washer are heat treated to achieve approximately Rc 50 hardness. Also the parts are subsequently deburred and shot peened to improve fatigue life.

Having described above a simple and preferred version of the two piece fastener of the present invention, it will be understood that those skilled in the art will be aware of numerous variations and modifications without departing from the inventive concept. Accordingly, it is intended that the present invention be limited only as determined by reference to the scope of the claims appended hereto:

What I claim is:

1. A belt assembly wherein working elements are fastened by rigid fasteners to a flexible V-belt comprising; a flexible V-belt having semi-circular cog-like notches on the underside extended across the full width of the belt with the apex of the notches located at the approximate neutral axis of the belt, said belt having slots extending from the apex of the notches through to the top side of the belt, bowed semi-circular washers nested in the semi-circular cog-like notches having slots aligned with the slots in the belt and a width covering a substantial portion of the width of the belt at said notches, fastening elements having flat stem portions inserted through the aligned slots in the washers and the flexible belt and having flat flared end portions integral with the stem portions that are larger than the slots in the washers to prevent passage of the fastening elements therethrough, resilient pads on the top side of the belt having slots aligned with the slots in the belt, the stem portions of the fastening elements protruded through the slots in the resilient pads, and fastening means fastening working elements to the protruded stem portions with the resilient pads compressed to place a tension load on the fastening element which is resisted at the interface between the semi-circular bowed washer and the portion of the belt defined by the semi-circular notch.

2. A belt assembly wherein working elements are fastened by rigid fasteners to a flexible belt comprising; a flexible belt having cog-like notches on the underside with the apex of the notches located at the approximate neutral axis of the belt, said belt having slots extending from the apex of the notches through to the top side of the belt, pre-bowed resilient washers forming a normal radius of curvature nested in the cog-like notches having slots aligned with the slots in the belt, fastening elements having flat stem portions inserted through the aligned slots in the washers and the flexible belt and having flat semi-circular flared end portions integral with the stem portions that are larger than the slots in the washers to prevent passage of the fastening elements therethrough and having a greater radius of curvature than the normal radius of curvature of the washer, resilient pads on the top side of the belt having slots aligned with the slots in the belt, the stem portions of the fastening elements protruded through the slots in the resilient pads, and fastening means fastening working elements to the protruded stem portions with the resilient pads compressed to place a tension load on the fastening elements and thereby achieve an interference fit with the bowed washer forced over the flared end of the stem.

* * * * *